United States Patent
Kwon et al.

(10) Patent No.: US 12,027,999 B2
(45) Date of Patent: Jul. 2, 2024

(54) OMNIDIRECTIONAL WIND ENERGY HARVESTER

(71) Applicants: Hyundai Motor Company, Seoul (KR); Kia Corporation, Seoul (KR)

(72) Inventors: Dae-Sung Kwon, Seoul (KR); Il-Seon Yoo, Suwon-si (KR); Jang-Hyeon Lee, Gunpo-si (KR); Dong-Gu Kim, Suwon-si (KR); Hyun-Soo Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

(21) Appl. No.: 18/062,908

(22) Filed: Dec. 7, 2022

(65) Prior Publication Data

US 2024/0022184 A1    Jan. 18, 2024

(30) Foreign Application Priority Data

Jul. 13, 2022 (KR) .......................... 10-2022-0086376

(51) Int. Cl.
*H02N 1/04* (2006.01)
(52) U.S. Cl.
CPC ..................................... *H02N 1/04* (2013.01)
(58) Field of Classification Search
CPC ....................................................... H02N 1/04
USPC ......................................................... 310/310
See application file for complete search history.

(56) References Cited

U.S. PATENT DOCUMENTS

| 8,648,480 B1* | 2/2014 | Liu ...................... H02K 7/1892 |
| | | 290/8 |
| 11,513,246 B1* | 11/2022 | Iqbal ...................... G01V 1/003 |
| 11,863,088 B2* | 1/2024 | Zhang .................... H02N 2/186 |
| 2013/0227940 A1* | 9/2013 | Greenblatt .............. F03B 17/06 |
| | | 60/459 |
| 2016/0111980 A1* | 4/2016 | Sun ........................ H02N 2/185 |
| | | 310/339 |
| 2016/0149519 A1* | 5/2016 | Stevenson ................ H02N 3/00 |
| | | 310/309 |

(Continued)

FOREIGN PATENT DOCUMENTS

| CN | 106089590 A | 11/2016 |
| CN | 208900293 U | 5/2019 |

(Continued)

OTHER PUBLICATIONS

CN 115405459 (Year: 2022).*

*Primary Examiner* — Ahmed Elnakib
(74) *Attorney, Agent, or Firm* — Slater Matsil, LLP (57) ABSTRACT

In accordance with an embodiment, an omnidirectional energy harvester device includes: a harvesting member including an electrode pad having a first electrode disposed on an upper surface of the electrode pad, and a friction pad spaced apart from the electrode pad and having a second electrode disposed on an upper surface of the friction pad; and a vortex-induced vibration column fixedly coupled to the harvesting member at a lower surface of the vortex-induced vibration column. The vortex-induced vibration column is configured to generate vibration by an external force at an upper portion of the vortex-induced vibration column, wherein the first electrode disposed on the electrode pad and the second electrode disposed on the friction pad are electrically connected.

18 Claims, 7 Drawing Sheets

(56) References Cited

U.S. PATENT DOCUMENTS

| | | | | |
|---|---|---|---|---|
| 2020/0070664 A1* | 3/2020 | In | ............................ | F03D 3/002 |
| 2021/0223281 A1* | 7/2021 | Love | ...................... | G01M 9/02 |
| 2021/0328525 A1* | 10/2021 | Lua | ....................... | H02N 2/188 |
| 2024/0022184 A1* | 1/2024 | Kwon | ..................... | H02N 1/08 |
| 2024/0048077 A1* | 2/2024 | Kwon | .................. | H02N 11/002 |

FOREIGN PATENT DOCUMENTS

| | | |
|---|---|---|
| CN | 111313754 A | 6/2020 |
| CN | 113090451 A | 7/2021 |
| KR | 20170109509 A | 9/2017 |
| KR | 101920321 B | 11/2018 |

\* cited by examiner

OMNIDIRECTIONAL WIND ENERGY HARVESTER

CROSS-REFERENCE TO RELATED APPLICATIONS

This application claims priority to Korean Patent Application No. 10-2022-0086376, filed on Jul. 13, 2022, which is incorporated herein by reference in its entirety.

TECHNICAL FIELD

The present disclosure relates to an energy harvester device, and more particularly, to an energy harvester device using a vibrating vortex.

BACKGROUND

Vortex induced vibration (VIV) refers to a phenomenon in which a periodic vortex is formed as a flow separation occurs in a fluid flowing along the surface of a structure (bluff body) so that the bluff body vibrates due to the pressure difference therefrom, and is affected by a flow rate of the fluid, a diameter of the bluff body, etc.

An energy harvester may use VIV by fixing a cylinder-shaped structure on top of a piezoelectric cantilever to harvest energy through deformation in the cantilever by cylinder vibration regardless of the wind direction.

Examples of the conventional triboelectric wind energy harvester mainly include a harvester using a blade/wind cup similar to a wind generator, a harvester using a wind channel, a harvester using a thin plate with a spacer, etc., and utilization of such a harvester as a self-powered wind velocity/direction sensor has been actively studied.

Among them, in the case of the harvester using the wind channel having a venturi structure, although there is an advantage of having a simple structure, it is difficult to cope with the omnidirectional wind because energy harvesting is possible only with the wind that matches the direction of the channel.

In addition, in the case of the triboelectric-electromagnetic induced hybrid harvester using the wind cup, although energy harvesting is possible in response to the omnidirectional wind, it has a limitation in that the volume and mass of the system increase due to its complicated structure.

The matters described in the background art are intended to help the understanding of the background of the invention, and may include matters that are not already known to those of ordinary skill in the art to which this technology belongs.

SUMMARY

According to an aspect of the present disclosure, there is provided an omnidirectional energy harvester device including: a harvesting member including an electrode pad having an electrode on an upper surface thereof, and a friction pad spaced apart from the electrode pad and having an electrode on an upper surface thereof; and a vortex-induced vibration column fixedly coupled to the harvesting member at a lower surface thereof to generate vibration by an external force at an upper portion thereof, wherein the electrode formed on the electrode pad and the electrode formed on the friction pad are electrically connected.

Here, the electrode pad and the friction pad may be arranged in parallel when no external force is applied thereto.

The harvesting member may further include a conductive rod coupled to an upper surface of the friction pad, and a membrane member coupled to an upper surface of the conductive rod, wherein the electrode formed on the electrode pad and the electrode formed on the friction pad are electrically connected through the conductive rod.

In addition, the lower surface of the vortex-induced vibration column may be coupled to the upper surface of the membrane member.

Thus, upon the occurrence of vibration in the vortex-induced vibration column, the vibration may affect the behavior of the conductive rod and the friction pad so that a gap between the friction pad and the electrode pad is changed.

Further, the friction pad may be shape-deformable when the friction pad is in contact with the electrode pad.

Meanwhile, the harvesting member may further include an elastic member having both ends coupled to the electrode pad and the friction pad, respectively.

In addition, the vortex-induced vibration column may be formed to be hollow.

In addition, the vortex-induced vibration column may be configured such that an outer diameter of the upper portion thereof is larger than that of a lower portion thereof.

In addition, the harvester device may further include a housing in which the harvesting member is disposed.

In addition, the electrode pad and the friction pad may have a planar shape.

On the other hand, the friction pad may be composed of a plurality of friction bands extending in a radial direction from a central portion thereof, wherein the plurality of friction bands is spaced apart at regular intervals from each other in a circumferential direction.

In addition, the electrode pad may have a downwardly inclined shape or a curved shape from the central portion toward the outer portion thereof.

In addition, the electrode formed on the electrode pad may be formed in a structure segmented into a plurality of electrode segments in a circumferential direction.

Alternatively, the electrode formed on the electrode pad may be formed in a structure segmented into a plurality of electrode segments in a radial direction.

On the other hand, the vortex-induced vibration column may be a tubular column in which an air-injectable space is formed so that the volume thereof is changed according to an air-injection state.

The omnidirectional energy harvester device according to the present disclosure is not limited in size and weight, so it can be carried in a relatively small space such as a vehicle, and can be easily used as an auxiliary power source in a desired place.

That is, the harvester device can be used as an installed power source that can be used as an auxiliary power supply even during outdoor activities.

In addition, the harvester device can be used as an environmental monitoring sensor to monitor the wind speed and direction and periodically transmit measurement results without power supply.

In addition, the harvester device can be used as a sensor to measure various physical quantities by being driven through various external forces in addition to wind.

DETAILED DESCRIPTION OF ILLUSTRATIVE EMBODIMENTS

In order to fully understand objectives, operations, and effects and advantages of the present disclosure, a reference should be made to the accompanying drawings illustrating preferred embodiments of the present disclosure and the contents described in the accompanying drawings.

In describing the disclosed embodiments, a description about known techniques or a repetitive description that may unnecessarily obscure the gist of the present disclosure will be shortened or omitted.

In various embodiments, a harvester device is capable of coping with an omnidirectional external force without increasing the volume and mass of the system.

Figure 1:
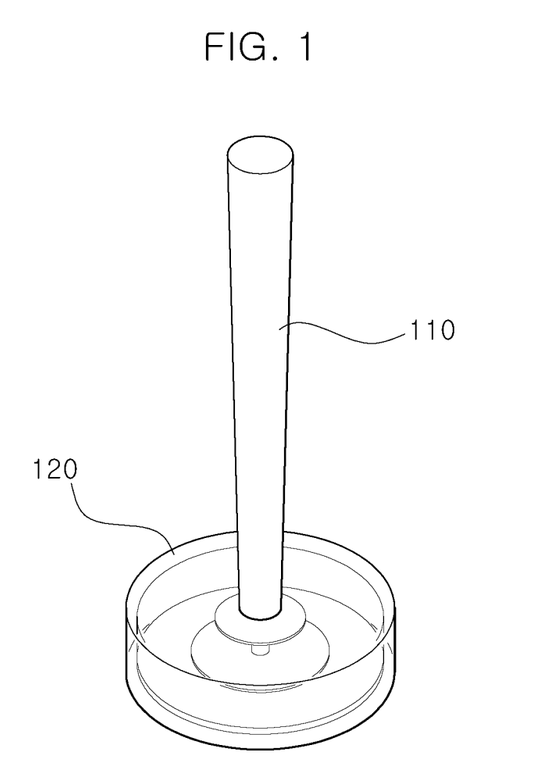
FIG. 1 is a view schematically illustrating an omnidirectional energy harvester device according to a first embodiment of the present disclosure.
Figure 2:
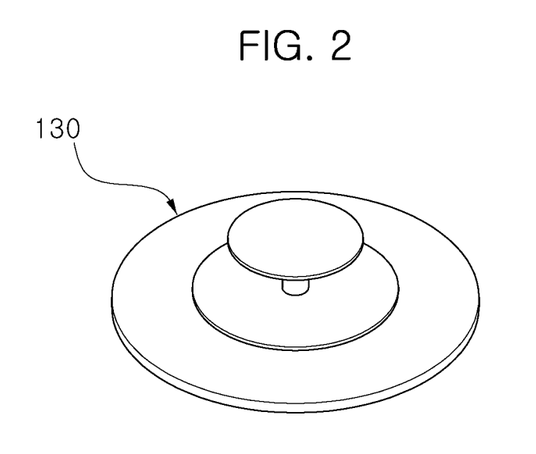
FIG. 2 is a view illustrating a harvesting member of the omnidirectional energy harvester device according to the present disclosure.
Figure 3:
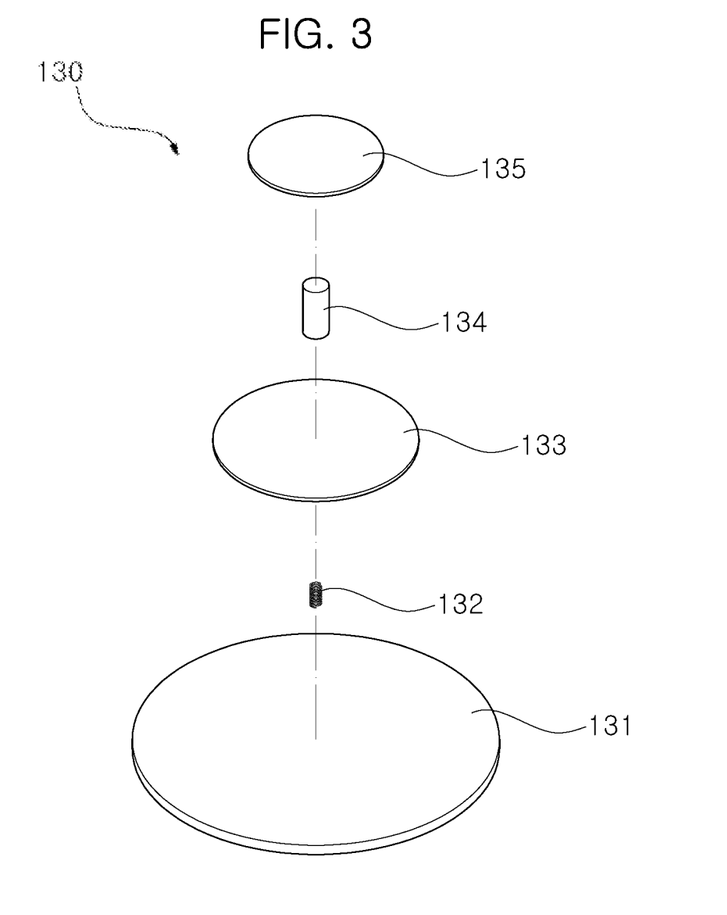
FIG. 3 is an exploded perspective view of FIG. 2.
Figure 4:
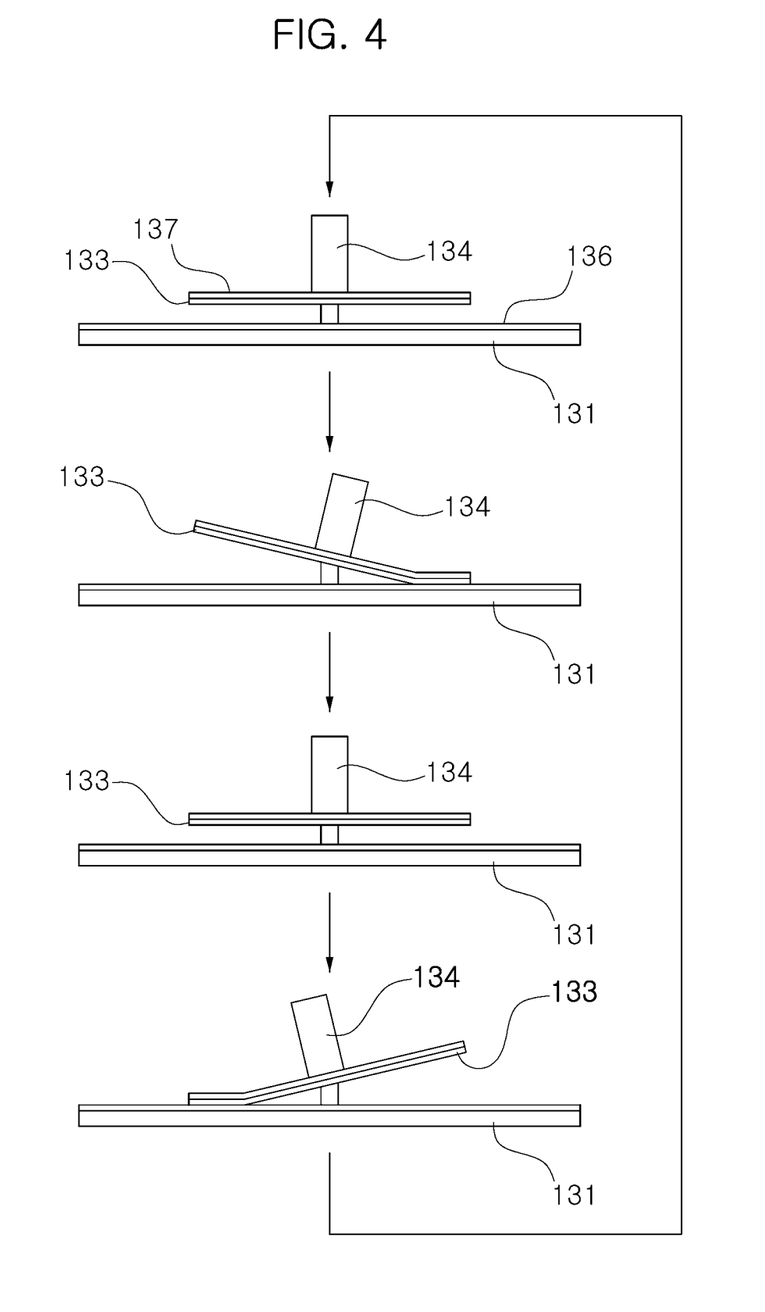
FIG. 4 is a view illustrating the operating state of the omnidirectional energy harvester device according to the present disclosure.

FIG. 1 is a view schematically illustrating an omnidirectional energy harvester device according to a first embodiment of the present disclosure, FIG. 2 is a view illustrating a harvesting member of the omnidirectional energy harvester device according to the present disclosure, FIG. 3 is an exploded perspective view of FIG. 2, and FIG. 4 is a view illustrating the operating state of the omnidirectional energy harvester device according to the present disclosure.

Hereinafter, an omnidirectional energy harvester device according to a first embodiment of the present disclosure will be described with reference to FIGS. 1 to 4.

The present disclosure is directed to a triboelectric omnidirectional energy harvester structure, and a configuration and driving principle of a self-powered sensor utilizing the same. A wind energy harvester and a wind speed/direction sensor will be described as an example, and may have a structure applicable to various kinds of external power energy other than wind power.

The harvester device according to the present disclosure is a device in which two or more planar plates each having a patterned electrode are arranged in parallel below a cylinder structure that vibrates due to a vortex generated by wind so that the distance between the planar plates changes and contact-separation occurs, thereby harvesting energy in a triboelectric method.

In addition, it is possible to determine the direction or speed of the wind by comparing the magnitude of the output voltage generated from the patterned electrodes, which makes it possible to implement a self-powered wind speed/direction sensor that can detect wind speed/direction without additional power supply to a sensing unit.

Specifically, the omnidirectional energy harvester device according to the first embodiment of the present disclosure includes a vortex-induced vibration (VIV) column 110, a housing 120, and a harvesting member 130 such that a movable upper portion of the VIV column is displaced due to an external force from the omnidirectional direction so that the harvesting member 130 disposed in the housing 120 may harvest energy in response to the displacement of the VIV column 110 to detect the wind direction and speed.

The VIV column 11o is formed with a cylinder-type member that has a lower portion fixedly coupled to the harvesting member 130 and an upper portion formed as a free end so that the upper portion is displaced with respect to the fixed lower portion by an external force.

The VIV column may be formed in a hollow tapered shape in which a diameter thereof increases from the upper portion toward the lower portion.

The housing 120 serves to protect the built-in harvesting member 130 while supporting the VIV column 110, thereby suppressing the deterioration of harvesting performance occurring due to external moisture change and the inflow of contaminants.

The harvesting member 130 includes an electrode pad 131, an elastic member 132, a friction pad 133, a conductive rod 134, a membrane member 135, and the like.

The electrode pad 131 may be configured as a planar circular or polygonal pad having a patterned electrode 136 on the upper surface thereof.

The friction pad 133 may also be configured as a circular or polygonal pad having a patterned electrode 137 on the upper surface thereof.

In addition, as will be described later, the friction pad may be formed from a flexible material having a certain rigidity.

So long as no external force is applied, the electrode pad 131 and the friction pad 133 are disposed in parallel.

The elastic member 132 has one end coupled to the electrode pad 131 and the other end coupled to the friction pad 133 to allow the friction pad 133 to return to its original state after being deformed.

The lower surface of the VIV column 110 is fixedly coupled to the upper surface of the membrane member 135, and the conductive rod 134 is coupled between the lower surface of the membrane member 135 and the upper surface of the friction pad 133.

Therefore, as illustrated in FIG. 4, when the VIV column 11o vibrates, the conductive rod 134 and the elastic member 132 are deformed to cause the friction pad 133 to be tilted at an angle so that the distance between the friction pad 133 and the electrode pad 131 is changed and contact/separation therebetween is repeated.

According to the electronegativity characteristics for the material configuration, electron transfer occurs between the electrode 136 of the electrode pad 131 and the electrode 137 of the friction pad 133 upon contact/separation therebetween.

In addition, when the electrode 137 formed on the friction pad 133 is connected to the outside through the conductive rod 134, and the two electrodes 136 and 137 are connected together with a conductive wire, an electromotive force is generated, thereby making it possible to harvest power.

Figure 5:
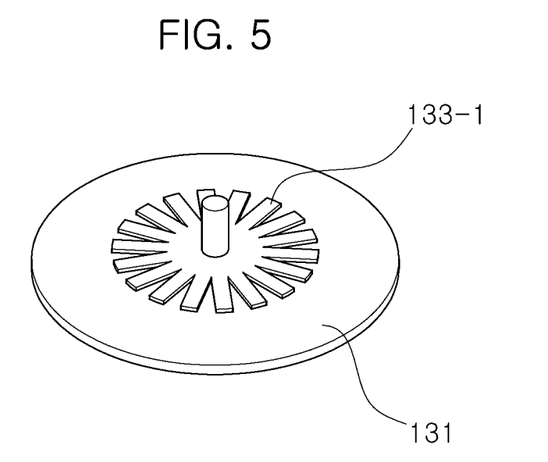
FIG. 5 is a view illustrating an applied embodiment of a friction pad of the omnidirectional energy harvester device according to the present disclosure.
Figure 6:
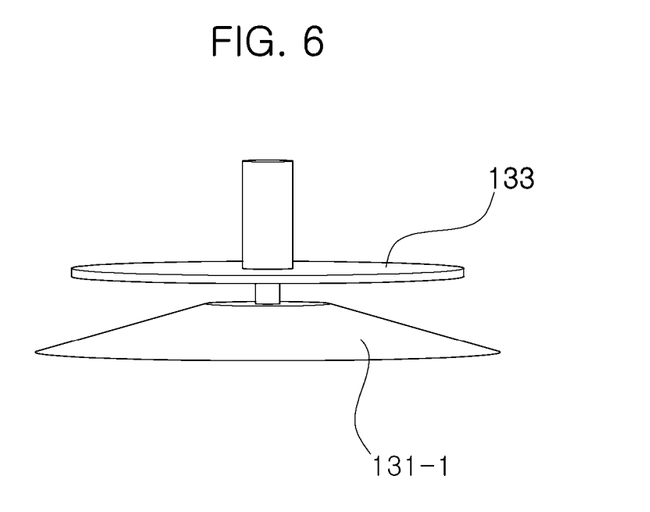
FIG. 6 is a view illustrating an applied embodiment of an electrode pad of the omnidirectional energy harvester device according to the present disclosure.

FIG. 5 is a view illustrating an applied embodiment of a friction pad of the omnidirectional energy harvester device according to the present disclosure, and FIG. 6 is a view illustrating an applied embodiment of an electrode pad of the omnidirectional energy harvester device according to the present disclosure.

The applied embodiments of FIGS. 5 and 6 are for more effectively generating a change in the contact area between the friction pad and the electrode pad.

Unlike the planar friction pad of the first embodiment, the friction band 133-1 of FIG. 5 is composed of a plurality of friction bands 133-1 radially extending with the same length and width from the center while being spaced apart at regular intervals from each other along the circumferential direction.

Further, an electrode pad 131-1 of FIG. 6 may have a curved shape such as a dome shape or a shape downwardly inclined from the center toward an outer portion thereof.

As such, the friction pad and the electrode pad may be modified into the configuration of the friction bands 133-1 or the inclined or curved electrode pad 131-1.

Figure 7:
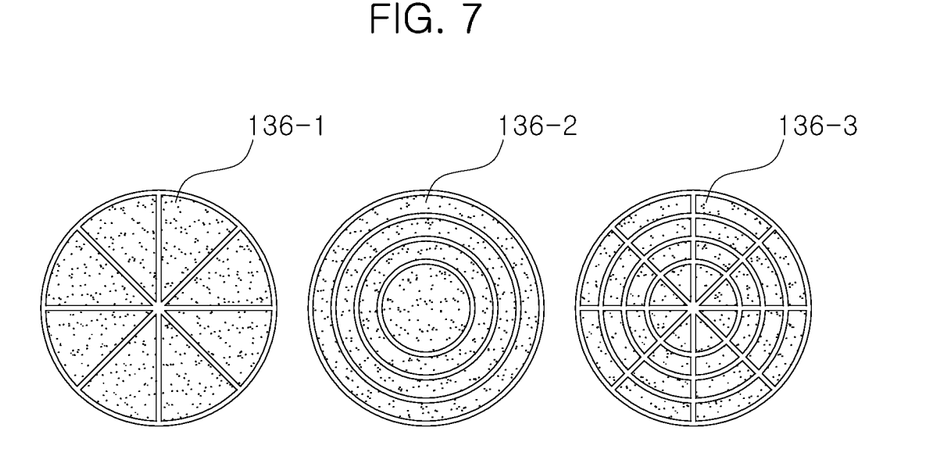
FIG. 7 is a view illustrating an applied embodiment of an electrode structure patterning of the omnidirectional energy harvester device according to the present disclosure.

Next, FIG. 7 illustrates various applied embodiments of a patterned electrode structure formed on the electrode pad 131 of the omnidirectional energy harvester device of the present disclosure.

The electrode 136-1 of the first applied embodiment may have a segmented structure along the circumferential direction, the electrode 136-2 of the second applied embodiment may have a segmented structure along the radial direction, and the electrode 136-3 of the third applied embodiment may have a combined structure of the patterned electrode structures of the first and second applied embodiments.

According to the present disclosure, it is possible to utilize the harvester device as a wind speed sensor, a wind direction sensor, or a wind speed/wind direction sensor, which is self-powered, by adjusting the electrode pattern formed on the electrode pad 131 as described above.

That is, according to the segmented electrode pattern, the direction of the electrode pad that generates a large output can be distinctly identified to detect the wind direction, or the magnitude of the output, the difference in the output voltage generated from the inner and outer electrodes from the center, or the like can be utilized to detect the wind speed.

Figure 8:
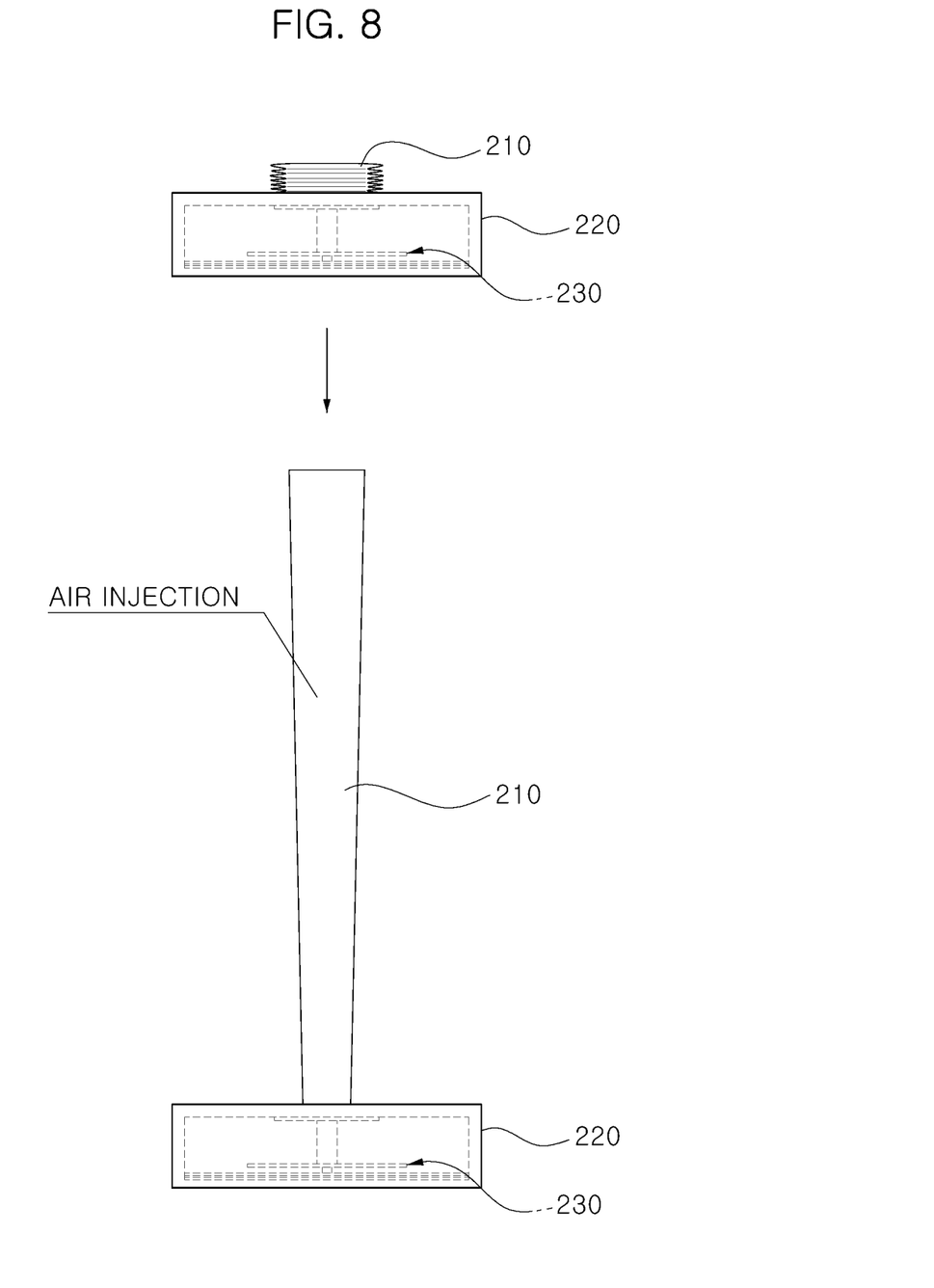
FIG. 8 is a view schematically illustrating an omnidirectional energy harvester device according to a second embodiment of the present disclosure.

Next, FIG. 8 schematically illustrates an omnidirectional energy harvester device according to a second embodiment of the present disclosure. A description of the same configuration as that of the omnidirectional energy harvester device according to the first embodiment will be omitted.

The omnidirectional energy harvester device according to the second embodiment includes, in place of the vortex-induced vibration column, a tubular column 210, a housing 220, and a harvesting member 230.

The tubular column 210 has a tube shape into which air can be injected as illustrated, so that before air injection, the height of the tubular column may be reduced to improve the portability, and after air injection, the tubular column may have the same function as the vortex-induced vibration column of the first embodiment.

That is, after being placed at a desired location to be installed, the tubular column 210 may be inflated with air, so that the tubular column can be utilized as an auxiliary power source.

Figure 9:
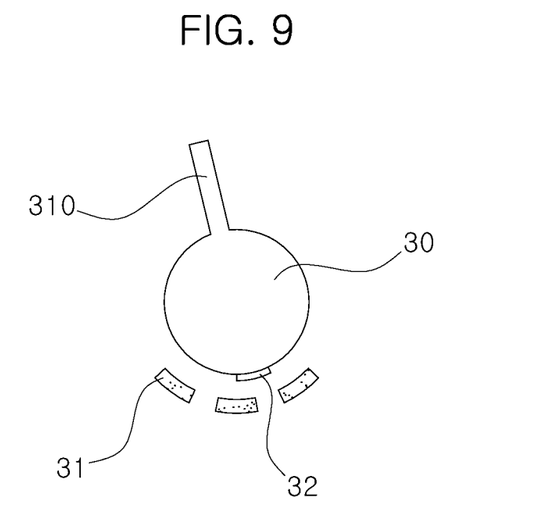
FIG. 9 is a view schematically illustrating an omnidirectional energy harvester device according to a third embodiment of the present disclosure.

Next, FIG. 9 schematically illustrates an omnidirectional energy harvester device according to a third embodiment of the present disclosure.

The omnidirectional energy harvester device according to the third embodiment illustrates an applied example of ball joint 30, wherein a vortex-induced vibration column 310 is coupled to one side of the ball joint 30, and a friction member 32 is coupled to the other side of the ball joint 30 opposite to the former side to which the vortex-induced vibration column 310 is coupled.

In addition, a patterned electrode 31 may be disposed concentrically with the ball joint 30 so as to be spaced apart a certain distance from the friction member 32 to detect a change in the distance between the friction member 32 and the patterned electrode 31 during the operation of the ball joint 30, and thus detect the motion direction and range of the ball joint 30. To this end, a plurality of patterned electrodes 31 is disposed so as to be spaced apart from each other.

As in this third embodiment, the energy harvester device may be used for applications where in addition to the wind, direct deformation/vibration can be applied to the VIV column, and the electrode pattern may be configured more precisely, so that the energy harvester device may be used as a self-powered sensor applicable to robot arms, etc.

While the present disclosure as described above has been illustrated with reference to the drawings, the present disclosure is not limited to the described embodiments, and it is obvious to those of ordinary skill in the art that various modifications and variations can be made without departing from the spirit and scope of the present disclosure. Therefore, such modifications or variations should be considered to belong to the claims of the present invention, and the scope of the present invention should be construed on the basis of the appended claims.

What is claimed is:

1. An omnidirectional energy harvester device comprising:
   a harvesting member including an electrode pad having a first electrode disposed on an upper surface of the electrode pad, and a friction pad spaced apart from the electrode pad and having a second electrode disposed on an upper surface of the friction pad; and
   a vortex-induced vibration column fixedly coupled to the harvesting member at a lower surface of the vortex-induced vibration column, the vortex-induced vibration column configured to generate vibration by an external force at an upper portion of the vortex-induced vibration column, wherein the first electrode disposed on the electrode pad and the second electrode disposed on the friction pad are electrically connected.

2. The omnidirectional energy harvester device of claim 1, wherein the electrode pad and the friction pad are arranged in parallel when no external force is applied thereto.

3. The omnidirectional energy harvester device of claim 1, wherein the harvesting member further comprises:
   a conductive rod coupled to the upper surface of the friction pad; and
   a membrane member coupled to an upper surface of the conductive rod, wherein the first electrode disposed on the electrode pad and the second electrode disposed on the friction pad are electrically connected through the conductive rod.

4. The omnidirectional energy harvester device of claim 3, wherein the lower surface of the vortex-induced vibration column is coupled to an upper surface of the membrane member.

5. The omnidirectional energy harvester device of claim 4, wherein upon an occurrence of vibration in the vortex-induced vibration column, the vibration affects a behavior of the conductive rod and the friction pad so that a gap between the friction pad and the electrode pad is changed.

6. The omnidirectional energy harvester device of claim 5, wherein the friction pad is shape-deformable when the friction pad is in contact with the electrode pad.

7. The omnidirectional energy harvester device of claim 5, wherein the harvesting member further comprises an elastic member having a first end coupled to the electrode pad, and a second end coupled to the friction pad.

8. The omnidirectional energy harvester device of claim 5, wherein the vortex-induced vibration column is hollow.

9. The omnidirectional energy harvester device of claim 5, wherein the vortex-induced vibration column is configured such that an outer diameter of the upper portion of the vortex-induced vibration column is larger than an outer diameter of a lower portion of the vortex-induced vibration column.

10. The omnidirectional energy harvester device of claim 5, further comprising a housing in which the harvesting member is disposed.

11. The omnidirectional energy harvester device of claim 5, wherein the electrode pad and the friction pad have a planar shape.

12. The omnidirectional energy harvester device of claim 5, wherein the friction pad is composed of a plurality of friction bands extending in a radial direction from a central portion of the friction pad, wherein friction bands of the plurality of friction bands are spaced apart at regular intervals from each other in a circumferential direction.

13. The omnidirectional energy harvester device of claim 5, wherein the electrode pad has a downwardly inclined shape or a curved shape from a central portion of the friction pad toward an outer portion of the friction pad.

14. The omnidirectional energy harvester device of claim 5, wherein the first electrode disposed on the electrode pad comprises a plurality of electrode segments arranged in a circumferential direction.

15. The omnidirectional energy harvester device of claim 5, wherein the first electrode disposed on the electrode pad comprises a plurality of electrode segments arranged in a radial direction.

16. The omnidirectional energy harvester device of claim 5, wherein the vortex-induced vibration column is a tubular column having an air-injectable space, wherein a volume of the air-injectable space is configured to change according to an air-injection state.

17. An omnidirectional energy harvester device comprising:
a harvesting member comprising:
an electrode pad having a first electrode disposed on an upper surface of the electrode pad,
a friction pad spaced apart from the electrode pad and having a second electrode disposed on an upper surface of the friction pad,
a conductive rod having a first end coupled to the upper surface of the friction pad and electrically connecting the first electrode and the second electrode, and
a membrane member having a lower surface coupled to a second end of the conductive rod; and
a vortex-induced vibration column having a lower surface fixedly coupled to the harvesting member at an upper surface of the membrane member.

18. A method of operating an omnidirectional energy harvester device comprising a harvesting member including an electrode pad having a first electrode disposed on an upper surface of the electrode pad, and a friction pad spaced apart from the electrode pad and having a second electrode disposed on an upper surface of the friction pad; and a vortex-induced vibration column fixedly coupled to the harvesting member at a lower surface of the vortex-induced vibration column, wherein the first electrode disposed on the electrode pad and the second electrode disposed on the friction pad are electrically connected, the method comprising:
receiving, by the vortex-induced vibration column, an external force at an upper portion of the vortex-induced vibration column;
vibrating, by the vortex-induced vibration column, in response to the external force; and
changing a gap between the friction pad and the electrode pad in response to the vibrating.

\* \* \* \* \*